United States Patent Office 3,554,774
Patented Jan. 12, 1971

3,554,774
PROCESS FOR THE MANUFACTURE OF COLORED STRUCTURES FROM CELLULOSE TRIACETATE
Maxwell James Hewitt, Kenilworth, England, and Felix Steinlin, Dornach, Solothurn, and Werner Grubenmann, Muttenz, Switzerland, assignors to Courtaulds Limited, Coventry, England, a company of the United Kingdom, and Ciba Limited, Basel, Switzerland, a Swiss company
No Drawing. Filed Aug. 29, 1969, Ser. No. 854,325
Claims priority, application Switzerland, Sept. 2, 1968, 13,131/68
Int. Cl. D01f 1/04
U.S. Cl. 106—193                                          5 Claims

ABSTRACT OF THE DISCLOSURE

Process for the manufacture of colored articles from cellulose triacetate, which comprises adding to a solution of cellulose triacetate a preparation consisting of a pigment and/or an optical brightener and ethyl cellulose, shaping the so pigmented solution to structures and removing the solvent.

---

This invention relates to fast and levelly dyed structures, for example foils, and more especially fibers which are obtained from cellulose triacetate and a preparation consisting of a pigment and/or an optical brightener and ethyl cellulose are added to a cellulose triacetate solution, the pigmented solution shaped to structures and the solvent subsequently removed.

It is known that cellulose triacetate in the form of solutions can as a rule be shaped to structures, particularly fibers. Although such fibers, some of which are commercially available under trade names, such as "Tricel," "Arnel" etc., can be dyed with disperse dyestuffs, there is a need to manufacture such fibers in a spin-colored state also with the aid of pigments. Naturally it is desirable to change the ordinary spinning process as little as possible, and especially to be able to use the customary solvents. For example, dimethylsulfoxide, ethylene chloride, and particularly methylene chloride. It is advantageous to use a mixture consisting of 86–94% of methylene chloride and 14–6% of a lower aliphatic alcohol, especially methanol or ethanol.

The pigment preparations to be used according to the invention are obtained preferably by mixing, especially by kneading a pigment with ethyl cellulose, optionally in the presence of grinding assistants, which can subsequently be extracted again, advantageously water-soluble salts. The pigments may be of inorganic nature, for example carbon black, titanium dioxide, or ferric hydroxides, ultramarine or metal powders, or of organic nature, for example they may belong to the group of the azo or anthraquinone dyestuffs, phthalocyanines, indigoids, dioxazines, perylene tetracarboxylic acid diimides, perinones, quinacridones or nitro dyestuffs. In addition, optical brighteners with a pigment character also come into consideration. Mixtures of different pigments or mixtures of pigments with optical brighteners may also be used. The pigments are advantageously in a finely divided form. It is preferable to use preparations that consist of 25–75% of pigment and 75–25% of cellulose ether.

With these preparations a homogeneous dispersion of the pigment in the solution of the cellulose triacetate can easily be achieved. The pigmented solutions may contain further adjuvants, such as softening agents or the assistants conventionally used in the spinning process. Instead of adding the pigment directly to the cellulose triacetate solution to be dyed, concentrated stock solutions may be prepared which may contain 5 to 15% of pigment, and these stock solutions are added to the spinning mass, for example by injection before spinning. The processing of the resulting dyed solutions to structures, for example foils or fibers, can be carried out after the dry- or wet-spinning process by a method known per se. The resulting structures are distinguished by a level dyeing.

The result of the process according to the invention is surprising, because it was known that ethyl cellulose is incompatible with cellulose acetate (cf. "Ethyl Cellulose" of the Hercules Powder Company, 1962, page 33).

The following examples illustrate the invention, the parts and percentages being by weight unless otherwise stated.

EXAMPLE 1

To a solution of 100 parts of cellulose triacetate (degree of polymerization about 370, degree of acetylation about 62%) in 810 parts of methylene chloride and 90 parts of methanol there are added 2 parts of a pigment preparation consisting of 1 part of the disazo dyestuff of the formula

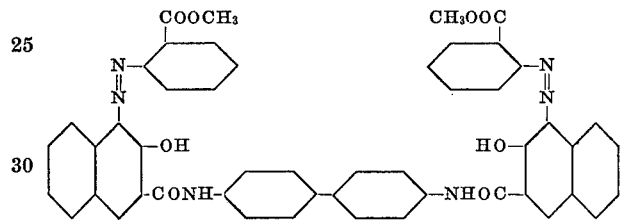

and 1 part of ethyl cellulose (melting point about 170° C., degree of etherification about 49%) and dispersed by stirring in a closed vessel, the ethyl cellulose dissolving. The pigmented triacetate solution is poured out to form an evenly thin layer by means of casting equipment and the solvent removed by evaporation. A brilliantly red colored film of high transparence is obtained.

The pigment preparation used in the first paragraph can be obtained by kneading 50 parts of the pigment with 50 parts of ethyl cellulose in the presence of 200 parts of sodium chloride as grinding assistant and 50 parts of diacetone alcohol, washing out the sodium chloride and diacetone alcohol with water, drying the granulate and grinding.

EXAMPLE 2

To a mixture of 18 parts of methylene chloride and 2 parts of methanol there are added 2 parts of the pigment preparation of Example 1 which is dispersed therein by stirring, the ethyl cellulose dissolving. This stock batch is added to a spinning solution consisting of 100 parts of cellulose triacetate (degree of polymerization about 370, acetylation degree about 62%) in 360 parts of methylene chloride and 40 parts of methanol, and mixed homogeneously. The resulting colored triacetate solution is processed in the customary manner to triacetate fibers by dry-spinning which are colored evenly red and differ in their textile mechanical properties only slightly from uncolored triacetate fibers prepared in the same manner.

EXAMPLE 3

2 parts of the pigment preparation described in Example 1 are stirred into a spinning solution consisting of 23 parts of cellulose triacetate (degree of polymerization 310, degree of acetylation 60.6%) in 90 parts of methylene chloride and 10 parts of methanol, the ethyl cellulose dissolving. The resulting pigmented spinning solution is processed by wet-spinning, i.e. by squeezing the spinning mass through a jet into a spinning bath of 34 vol. percent methylene chloride and 66 vol. percent methanol to brilliant red colored fibers.

Similarly good results are obtained by using pigment preparations which contain instead of the dyestuff used in Example 1 one of the following pigments: β-Cu-phthalocyanine, the yellow disazo dyestuffs of the formula

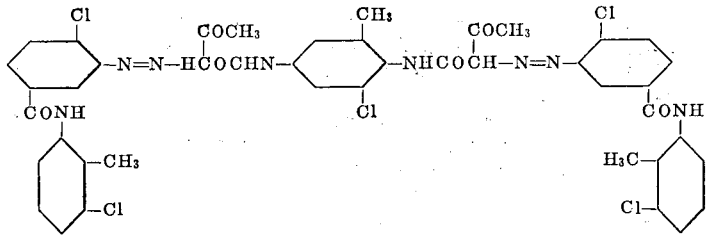 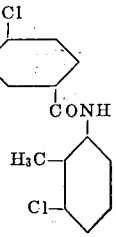

and

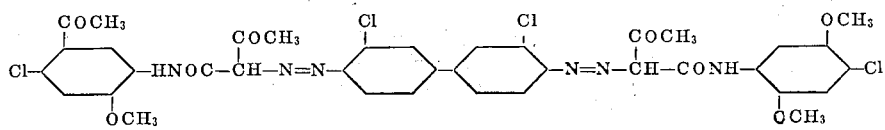

the violet dioxazine dyestuff of the formula

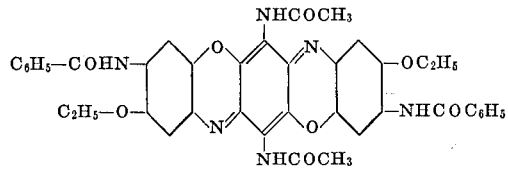

or the brown nitro dyestuff of the formula

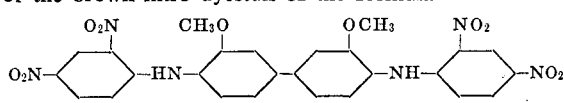

We claim:

1. A process for the manufacture of colored articles from cellulose triacetate, which comprises adding to a solution of cellulose triacetate a preparation consisting of a pigment and/or an optical brightener and ethyl cellulose shaping the so pigmented solution to structures and removing the solvent.

2. A process as claimed in claim 1, wherein a solution of cellulose triacetate in a solvent mixture consisting of 86–94% methylene chloride and 14–6% of a lower aliphatic alcohol is used.

3. A process as claimed in claim 1, wherein a preparation consisting of 25–75% of pigment and 75–25% of ethyl cellulose is used.

4. A process as claimed in claim 1, wherein the pigmented cellulose triacetate solution is spun to fibers.

5. Pigmented articles obtained according to claim 1.

References Cited

UNITED STATES PATENTS

| | | | |
|---|---|---|---|
| 1,889,045 | 11/1932 | Dreyfus | 264—78 |
| 1,927,145 | 9/1933 | Whitehead | 264—78 |
| 1,955,825 | 4/1934 | Palmer | 264—78X |
| 2,071,250 | 2/1937 | Carothers | 260—106 |
| 2,072,858 | 3/1937 | Ellis | 264—78 |
| 3,300,325 | 1/1967 | Lindquist | 106—197X |
| 3,336,357 | 8/1967 | Strobel et al. | 106—197X |
| 3,414,644 | 12/1968 | Myles et al. | 264—168 |

DONALD J. ARNOLD, Primary Examiner

J. H. WOO, Assistant Examiner

U.S. Cl. X.R.

264—78, 200, 207, 211; 106—196